July 10, 1951 H. H. SCOTT 2,559,902

BIAS BLOCKING MEANS TO CUTOFF AMPLIFIER DURING RECORD CHANGING OPERATION

Filed Sept. 27, 1946 4 Sheets-Sheet 1

INVENTOR.
Hermon Hosmer Scott
BY
David Rines
ATTORNEY

July 10, 1951 H. H. SCOTT 2,559,902

BIAS BLOCKING MEANS TO CUTOFF AMPLIFIER DURING RECORD CHANGING OPERATION

Filed Sept. 27, 1946 4 Sheets-Sheet 2

INVENTOR.
Hermon Hosmer Scott
BY David Rines
ATTORNEY

INVENTOR.
Hermon Hosmer Scott
BY David Rines
ATTORNEY

July 10, 1951 H. H. SCOTT 2,559,902

BIAS BLOCKING MEANS TO CUTOFF AMPLIFIER DURING RECORD CHANGING OPERATION

Filed Sept. 27, 1946 4 Sheets-Sheet 4

INVENTOR.
Hermon Hosmer Scott
BY David Rines
ATTORNEY

Patented July 10, 1951

2,559,902

UNITED STATES PATENT OFFICE 2,559,902

BIAS BLOCKING MEANS TO CUT OFF AMPLIFIER DURING RECORD CHANGING OPERATION

Hermon Hosmer Scott, Lincoln, Mass.

Application September 27, 1946, Serial No. 699,714

21 Claims. (Cl. 179—100.4)

Figures 1, 2:
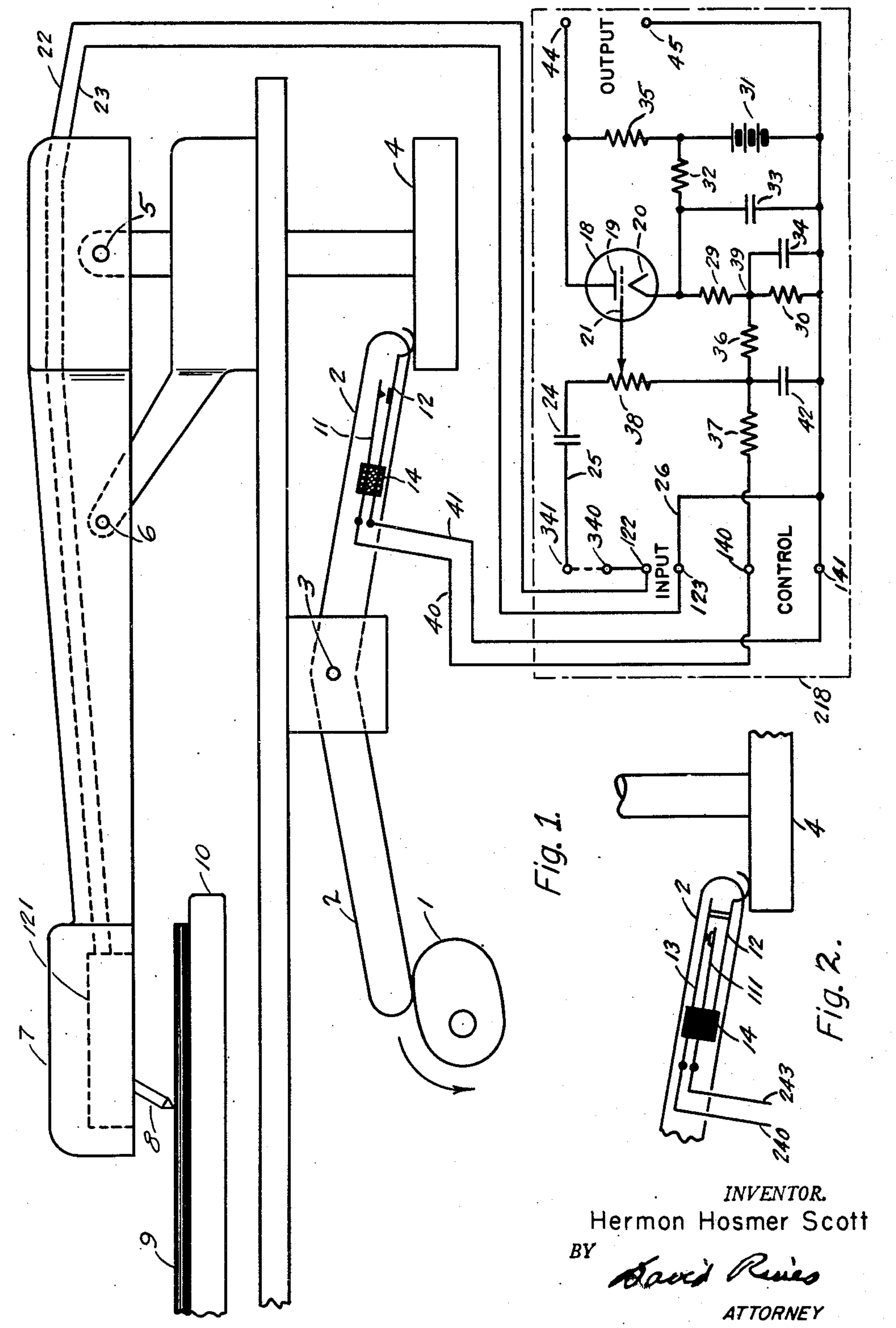

The present invention relates to methods of and systems for reducing noise, and more particularly noise such as is attendant upon the operation of phonographs, radio receivers and other systems for reproducing sound or other signals from discs and other types of recordings, and from other sources.

The changing of disc records, tapes, films, wires, etc. on which the signal is recorded, whether accomplished manually or automatically, is attended by various undesirable signals and noise which are passed through the associated amplifying or reproducing system and detract materially from the enjoyment of the reproduced signal, particularly when the signal is music. For instance, in the operation of the conventional disc record changer, at the beginning of playing of a record an undesirable transient noise is caused when the pickup needle or stylus is lowered onto the record surface and again when it slides into the first groove of the record. There is also a period at the beginning of each record when no desired signal is recorded, and all that is heard is needle scratch or other undesirable noises caused by the pickup tracking the groove. Similarly, at the conclusion of the music the pickup needle runs into a spiral or eccentric groove which imparts an acceleration to the pickup for the purpose of triggering off an automatic stop or automatic changer. This groove is generally noisy, and a further transient noise is generally caused when the pickup is lifted out of the groove in the case of a record changer, or while the record is stopping in the case of an automatic stop.

Similar situations exist in systems for playing disc, film, tape or wire records during the periods at the beginning and at the end of the recording when the drive mechanism is either accelerating or decelerating, thus distorting any signal that may be recorded, and where, if no signal is recorded, nothing but noise is passed to the amplifying and reproducing equipment. It is very desirable to disable the amplifying or reproducing equipment or the pickup itself, so that these extraneous and undesirable signals are not transmitted or reproduced. The term "record" refers to any type of record or recording whether on a disc, film, tape, wire, etc.

Various automatic means have been devised for starting and stopping the record driving mechanism and for changing the records. In connection with these automatic means, it has been proposed to prevent transmission or reproduction of the recorded signal or the noise attendant upon the starting, stopping or operation of the mechanism. The prior proposals have not been satisfactory, however, because they have involved the employment of only simple contactors for short-circuiting or open-circuiting the pickup or other transmission circuit directly, and these it has been proposed to operate by the motion of the pickup itself or by cams associated with the mechanism. Reproduction of undesired noise or distorted signals still occurs, notwithstanding these prior proposals, both during the cut-off process before the commencement of the changing cycle, and even more noticeably during the resumption of the transmission or reproduction at the completion of the cycle, as when the pickup contacts the disc record, and also at times when the relative velocity between the recording and the pickup device is below or above a predetermined limit. The cutting-off and the resumption processes are, accordingly, attended with clicks, rumbles or distorted reproduction, and other noise effects jarring to the ear of the listener. No provision has been made on these devices, however, for preventing the transmission or reproduction of the attendant undesired signals and noise generated in the equipment during the stopping, starting or changing processes.

It has been proposed to employ a governor for closing the transmission circuit connected to a phonograph pickup at times only when the speed of the turntable upon which the phonograph record is disposed is greater than a certain value. This prevents the introduction of noise when the speed of the phonograph record is smaller than this value and also when the turntable is at rest, since the transmission circuit is open under these circumstances. According to this proposal, however, it is necessary to stop the turntable in order to change records and to restart the turntable after the change has been made, and this must be done, not automatically, but manually. As the governor is controlled entirely by the rate of speed of the turntable motor, moreover, it is not possible to control the transmission of the pickup signal as a function of the position of the pickup except, perhaps, incidentally at the termination of the playing of the record. Another disadvantage inherent in this proposal is the absence of a time delay; as soon as the transmission circuit is closed, the transmission of the signal occurs, not gradually, to provide a fade-in action, but with instantaneous abruptness.

According to a further proposal, provision is, indeed, made for eliminating the abruptness of the transmission, but in connection with a manual control only, for this further proposal has not been adapted to use with automatic record-changing apparatus.

An object of the present invention, therefore, is to improve upon prior proposals for preventing the transmission and consequent reproduction of undesired sounds at the beginning or the end of a recording, or both.

Another object is to provide a new and improved system for preventing such transmission and consequent reproduction under conditions when the only signal that might be so reproduced would be noise, or would introduce distortion or the like.

A further object is to prevent the transmission or reproduction of undesired sounds during the operation of an automatic record changing mechanism and to "fade in" the reproduction of the signal a predetermined length of time after completion of the record changing cycle. Another object of the invention is to prevent the transmission or reproduction of undesired sounds at the beginning of a recording, as when the pickup mechanism is moved into place or while the drive mechanism is accelerating and then to resume the transmission at a gradual rate so that if any desirable signal is present, the reproduction of that signal is increased gradually to the normal level. A still further object of the invention is to prevent the transmission or reproduction of undesired signals and noise at the end of a recording, as when the driving mechanism is decelerating or the pickup mechanism being moved out of playing position.

A further object of the invention is to prevent annoying clicks or other noises during the prevention of or the resumption of the transmission or reproduction of phonograph records.

Another object is to provide a new and improved automatic control of the above-described character with a predetermined definite time delay during which the transmitted signal may fade gradually in or out.

Another object still is to provide a new and improved automatic control of the above described character as a function of the position of the pickup.

Still another object is to provide a new and improved automatic control of the above-described character as a function of the velocity of the recording.

A further object still is to provide a new and improved system of the above-described character the control of which shall be in accordance with a specific characteristic of a recording of a particular type, such as the tension or driving force imposed upon a recording of the tape, wire, or film types during the pickup of the signal.

Other further objects will be explained hereinafter and will be particularly pointed out in the appended claims.

The invention is of particular value when used in conjunction with the other inventions disclosed in copending United States Patent applications Serial No. 641,673, filed January 17, 1946; Serial Nos. 642,411 and 642,412, filed January 19, 1946; Serial No. 642,961, filed January 23, 1946; and Serial Nos. 646,620 and 646,621, filed February 9, 1946, disclosing means for reducing the noise level during the reproduction of a recording or other signal.

To the attainment of these ends, a feature of the invention resides in not merely preventing the transmission or reproduction of the recorded signal, but also prolonging said prevention of transmission or reproduction a definite predetermined length of time both after the completion of the automatic changing cycle and before the commencement of the next cycle. According to the prefered embodiment of the invention that is herein illustrated and described, this result may be attained by controlling the bias of one or more vacuum tubes in the associated amplifying or transmission equipment as a function of the position of the pickup mechanism; or by controlling the bias of one or more of the vacuum tubes in the amplifying or transmission equipment in accordance with the relative velocity between the recording and the pickup device; or, in the case of films, tapes and wires, controlling the tension, speed or some other characteristics of the recording medium; or by the use of some other suitable time delay in order to prevent transmission of the signal a predetermined length of time after the mechanism has been started or the pickup moved into place and to reduce or resume said transmission at a gradual and pleasing rate.

Figure 3:
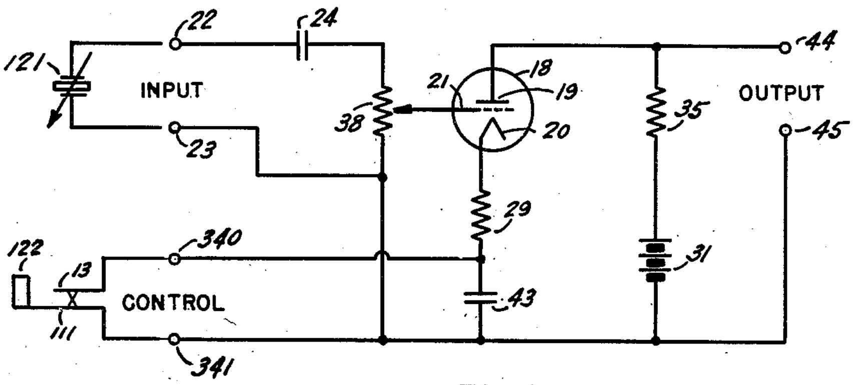
Figure 4:
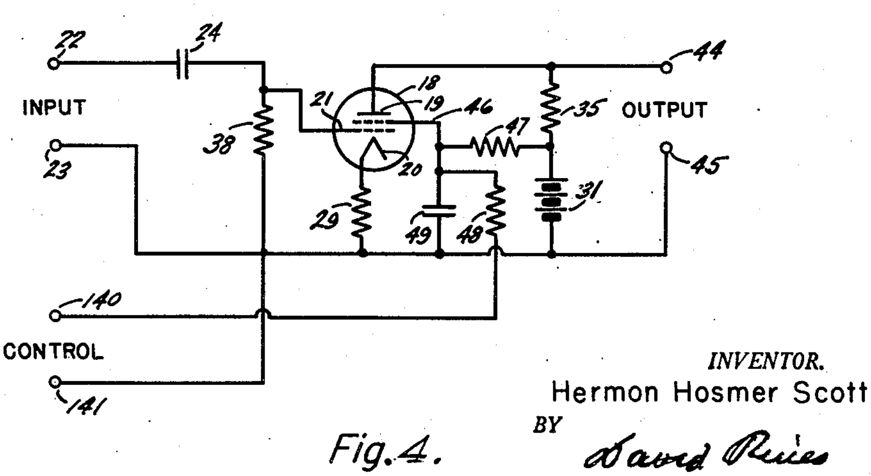
Figure 5:
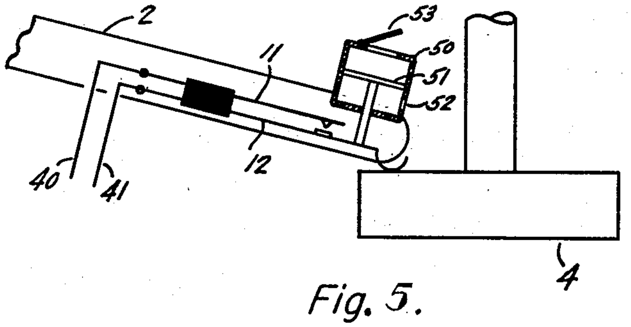
Figure 6:
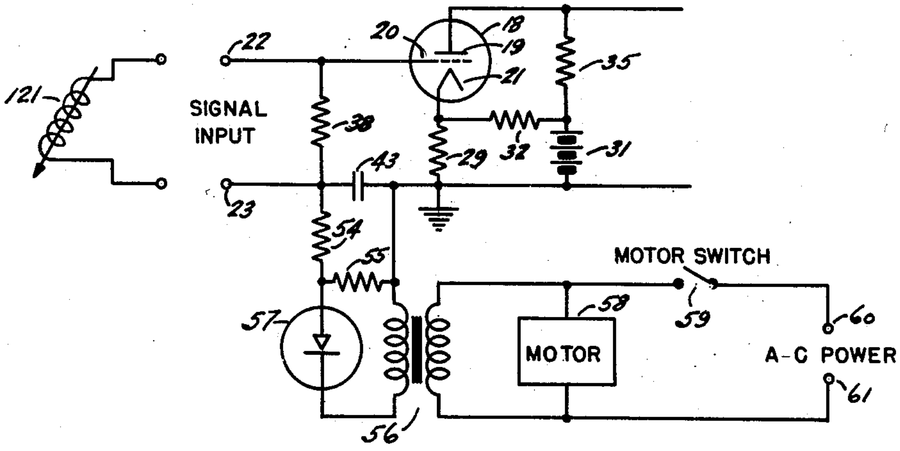
Figure 7:
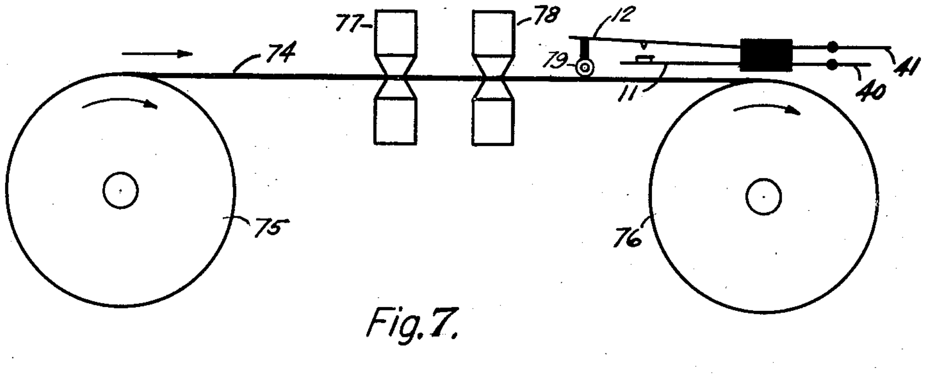
Figure 8:
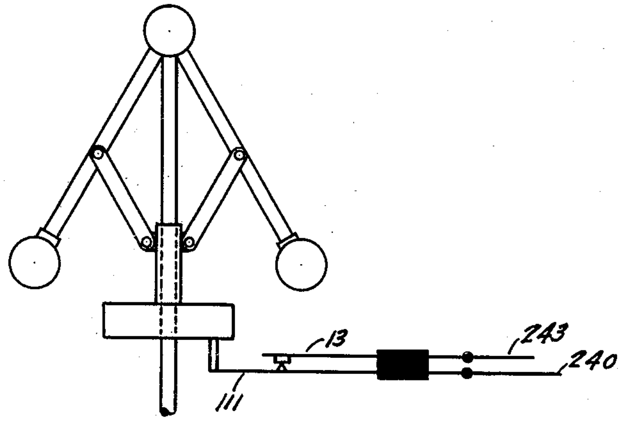

The invention will now be more fully explained in connection with the accompanying drawings, in which Fig. 1 is a diagrammatic view showing the application of the present invention to a conventional phonograph and an automatic record changer; Fig. 2 is a fragmentary view showing an alternative arrangement of the contactor; Fig. 3 is a diagrammatic view of a typical circuit arrangement adapted for use with the contactor of Fig. 2, and which may be substituted in Fig. 1; Fig. 4 is a similar view of a further alternative circuit which may be used in place of those shown in Figs. 1 and 3, or with the contactors shown in Figs. 1 and 2; Fig. 5 is a diagrammatic view of a mechanical time delay which may be used in place of the electrical time delays of Figs. 1, 3 and 4; Fig. 6 is a diagrammatic view of circuits and apparatus embodying a further vacuum-tube system having another means of control; Fig. 7 is a diagrammatic view showing the application of the present invention to a system for reproducing recordings from wires, tapes, films, etc.; and Fig. 8 is a similar view showing a further means of control applicable to the systems of Figs. 1 and 7.

Though the invention will first be described in connecton with a typical application involving disc phonograph records, it is equally applicable in the reproduction of other types of recordings or in other types of transmission circuits where it is desirable to prevent transmission for a predetermined time or during a predetermined portion of the recordings.

Fig. 1 represents one method of application of the present invention to a conventional phonograph comprising a record changing mechanism for handling disc records. During the record changing cycle the cam 1 rotates, moving the lever 2, which is pivoted at point 3. The lever 2 pushes downward on the counterweight or disc 4, which is attached to the pickup arm by a pin at point 5. The pickup arm is pivoted at point 6 so that it can move in a vertical plane. The rotation of cam 1, therefore, raises the pickup head 7 and the pickup stylus or needle 8 from the surface of the record 9, which is on the turntable 10. In playing records, the stylus 8 transmits the recorded vibrations to the pickup cartridge or motor 121, thus generating a voltage across leads 22 and 23 in accordance with the recorded signal. The mechanism for moving the pickup in a horizontal plane and for changing the record itself is not shown.

The contact blade 12 is so mounted that it strikes the counterweight 4 before the lever arm 2. As the lever arm 2 moves downward, contact arm 12 comes into contact with contact arm 11. This closes the circuit between leads 40 and 41. The contact blades are mounted on lever arm 2 by an insulating support 14.

The action of the arrangement shown in Fig. 1, therefore, is such that, during that portion of the changing cycle when the contacts 11 and 12 are closed, the leads 40 and 41 are effectively short-circuited, thus increasing the bias between the grid 21 and the cathode 20 of the vacuum tube 18, as will hereafter be explained, and thus preventing the transmission of any signal noise generated in or by the pickup to the associated equipment connected to terminals 44 or 45. With a conventional record changer, this squelch circuit will be operative during the changing cycle beginning shortly before the needle is raised from the record and continuing until after it is placed on the next record.

Since various record changers have different types of mechanisms, the actual installation of the contact blades 11 and 12 or the equivalent will vary somewhat between different types of changers. In all cases, however, the changers have parts which move through a definite series of positions during the changing process and which may be used to actuate the blades 11 and 12 or the equivalent.

It is also obvious that the system may be used in connection with manually operated phonographs and that the contactors may be attached to any part of the pickup, pickup arms or the mechanism and may be actuated by the pickup, pickup arms or some other part of the mechanism, to operate in the same manner to silence the noise which would otherwise be attendant upon the changing, starting or stopping of the records or changing of needles. Referring again to Fig. 1, the vacuum tube circuit 218, comprising the vacuum tube 18, is connected between the input leads 22 and 23 and the output terminals 44 and 45 and controlled by the contactor blades 11 and 12 through the leads 40 and 41.

The normal bias between the grid 21 and the cathode 20 of tube 18 is supplied by the voltage drop across resistor 29, which voltage drop is transmitted to the grid through resistor 36 and volume control or resistor 38. This voltage drop is caused by the normal flow of plate current starting with the battery or other power source 31 through the plate resistor or other impedance 35 to the plate 19 to the cathode 20 through the resistors 29 and 30 and thence back to the battery or other power source 31. Additional current may flow alternatively through the resistor 32 in shunt with the resistor 35 and the plate circuit of the vacuum tube. The additional voltage drop across resistor 30 is, when terminals 140 and 141 are connected together as by closing contacts 11 and 12, transmitted through resistor 37 and volume control or resistor 38 to the grid 21. This additional voltage drop appearing across resistor 30 is, in accordance with this invention, large enough to provide effective cut-off of the plate current flowing in tube 18 between the plate 19 and the cathode 20. Since the additional current flowing through resistor 32 is not cut off during this process, and since this current flows through resistor 30, it allows sufficient voltage drop to be maintained across resistor 30 to maintain effective cut-off of the plate current in tube 18, and thus to prevent transmission while contacts 11 and 12 are closed. If resistor 32 is not included, a much higher value of resistor 30 is required to obtain satisfactory reduction of transmission.

It is desirable not merely to prevent transmission during the changing cycles but for a definite period of time thereafter, until the pickup shall have reached the point in the record where the signal is recorded. To attain this end, the vacuum tube circuit or amplifier 218 shown in Fig. 1 is equipped with bias resistors 29 and 30, across which a voltage drop is developed as a result of current from the battery or other voltage source 31 flowing through the resistor 35, between the plate 19 and the cathode 20 of the vacuum tube 18, and through the resistor 32. Condensers 33 and 34 are for filtering purposes and to prevent degeneration, and may be omitted. Resistor 32 may also be omitted. Resistor 35 completes the plate circuit of the vacuum tube 18 and also may provide the proper load for the tube. This resistor may be replaced by an inductor or transformer, etc. Under normal operation the voltage drop across resistor 29 provides the correct operating bias between the cathode 20 and the grid 21 of the vacuum tube, the point 39 being connected to the grid through the resistor 36 and the volume control 38. The volume control 38 may be replaced by a fixed resistor, a transformer or other device. If, however, the control terminals 140 and 141 are connected together through a low impedance or short circuit as by closing the contact between blades 11 and 12 connected to leads 40 and 41 as heretofore described, the additional voltage drop across resistor 30 is applied to the grid 21 through resistor 37 and volume control 38. This additional bias is sufficient to prevent amplification or transmission through the vacuum tube by biasing the tube essentially to cut-off. The rate at which this extra bias is applied is governed mainly by the size of condenser 42 and the value of resistor 37. This prevents any click or thump when the transmission is cut off, and allows the transmission to be reduced at any desired rate so as to provide a pleasing effect. When the short circuit is removed from terminals 140 and 141 as by opening the contacts 11 and 12 the grid bias resumes its normal operating value at a rate dependent upon the value of condenser 42 and resistor 36. Thus, any desired time delay may be obtained. Furthermore, because of this feature the reproduction or transmission is resumed gradually so that if any audible or noticeable signal is present, it will be "faded in" rather than turned on suddenly. This is of particular importance since recordings are not standardized and the music or other signal may actually start on any particular record somewhat sooner than on the average record.

Prevention of transmission or substantially complete suppresion of the signal is often referred to as "squelching," and this type of circuit may be referred to as a "squelch circuit." Operation of the squelch circuit through control terminals 140 and 141 may be obtained by a set of contacts actuated by a push button, a switch or similar device, as well as by the automatic changing mechanism as shown in Fig. 1.

It is also possible that the squelching operation be obtained through opening a circuit rather than through closing a circuit. For instance, Fig. 2 shows a contact arrangement alternative to that shown in Fig. 1, but differing in that the normal function of arm 2 during the changing operation opens the contact between blades 111 and 13 which are connected respectively to leads 240 and 243. This arrangement can be substituted in Fig. 1 by making suitable changes in the bias circuits as will later be explained in connection with Fig. 3.

Fig. 3, for instance, shows a simplified vacuum-tube circuit or amplifier arrangement, in which the vacuum tube cannot transmit unless the control terminals 340 and 341 are connected together through a contactor or an impedance which is low for direct current, since otherwise there is no complete circuit for the plate current of the vacuum tube. The circuit of Fig. 3 may be substituted directly for the circuit 218 of Fig. 1 when used with the contactor as shown in Fig. 2 or some other contactor arrangement in which the contacts are open when it is desired that the signal be suppressed. Fig. 3, for instance, when terminals 340 and 341 are connected together, as by contact blades 111 and 13, which may be actuated by a push button 122 or other means as heretofore described, the plate current flows from the battery or power supply 31 through the resistor 35 to the plate 19 to the cathode 20, through the resistor 29 and thence through terminals 340 and 341 back to a battery 31. If the terminals 340 and 341 are connected to the leads 240 and 243 of Fig. 2, the plate current will normally flow except during the changing cycle, when the circuit between terminals 340 and 341 will be opened, thus preventing flow of the plate current. Resumption of flow of plate current after the connection between terminals 340 and 341 has been re-established will be determined by the size of condenser 43, which therefore provides a time delay and gradual "fading in" of the signal, if present.

A further alternative means of control is shown in Fig. 4, whereby the bias on a second control grid or screen grid 46 is controlled by a contactor or other device attached to terminals 140 and 141. Figs. 1, 3 and 4 show, therefore, several alternative means whereby transmission between a pair of input terminals 22 and 23 and a pair of output terminals 44 and 45 may be prevented through the opening or closing of an external circuit by a pair of contacts or by other means, and whereby resumption of transmission may be prevented for a predetermined time after restoration of the contacts to their normal position. The squelching action may be controlled manually or automatically. Furthermore, both the squelching action and the resumption of transmission may be at any desired rate depending upon the circuit constants, thus eliminating clicks or other undesirable effects and providing a gradual attenuation, or for resumption of any signal including noise which may be present.

While the circuits in Figs. 1, 3 and 4 are referred to as amplifiers, as is common practice, it is recognized that attenuation may be added, as by turning down the volume control 38 in Figs. 1 and 3 or by other means, so that the circuit as a whole need not show a gain but may actually show a loss. The principles of the present invention apply regardless of the degree of amplification or attenuation in the associated circuits.

In Fig. 5, an alternative means of obtaining a time delay is shown, in which a small cylinder 50 mounted on arm 2 contains a plunger or piston 51 connected mechanically with contact blade 12. One side of the piston is vented to the outside air at 52 while the other side is controlled by the flap valve 53. For the particular arrangement in Fig. 5, the flap valve 53 would normally be closed but is shown in the open position to illustrate the method of operation. Hence, when the lever arm 2 moves downward, carrying with it the cylinder 50, the closing of the contacts is accompanied by a relative upward movement of piston 51 in cylinder 50. During this movement, air pressure in the upper half of the cylinder opens the flap valve 53, allowing the air to escape. During the reversal of the process the closing of the flap valve by external air pressure prevents the piston from returning quickly to its normal position, and the consequent opening of contacts 11 and 12, until sufficient air has leaked into the cylinder, thus providing a mechanical time delay.

The leads 40 and 41 in Fig. 5 may be substituted for the corresponding leads in Fig. 1 and other figures and used with or without an additional electrical time delay. The mechanical time delay of Fig. 5 may also be applied to the contact arrangement of Fig. 2. This mechanical time delay in itself does not provide the gradual turning off or fading in of the transmission, but may be used in connection with an electrical circuit as shown in Figs. 1, 3 and 4, which will provide this effect also.

Fig. 6 shows an alternative means of controlling the bias on a countrol electrode in the vacuum tube amplifier particularlly applicable to manually operated phonographs or to systems for playing recordings made upon films, tapes or wires. In Fig. 6, the driving motor 58 is controlled by switch 59, which may be operated either manually or automatically. A transformer 56 has its primary connected to the same source of power as motor 58 and its secondary connected to a rectifier 57. When the motor switch 59 is opened the bias across resistor 29 caused by current flowing through resistor 32 is sufficient to bias the tube to cut-off and prevent transmission. When the motor switch is closed an additional and opposing bias is developed across condenser 43 as a result of rectified current flowing through resistor 55, said bias being conducted through resistors 54 and 38 to the grid 20. The net bias between the grid 20 and the cathode 21 should be sufficient for proper transmission. Thus, the reproducing system will transmit the signal applied to the input terminals 22 and 23 only while the driving motor is running, and because of the time delay such transmission will not become effective until a predetermined time after the driving motor has been turned on. The motor switch 59 may be associated with an automatic stop mechanism as is conventional practice on many phonographs. Since this action does not turn off the filament or heater of the vacuum tube, there is no undesirably long time delay, as would be the case with present types of heater-cathode tubes in the operation of the system.

Fig. 7 shows a method of using the system in conjunction with reproduction of signals recorded on tapes, wires or films. The recording medium 74 is wound from reel 75 to reel 76, passing through one or more recording or reproducing heads such as 77 and 78. These heads will vary in character, depending upon the type of recording, being, for instance, magnetic in the case of magnetic recording, photoelectric and optical in the case of sound-on-film recording, or may be similar to ordinary disc-phonograph pickups in the case of an embossed-groove type of recording. A roller 79, slider or similar device rests upon the film or other recording medium and is moved in accordance with the tension of the medium. As shown, with the mechanism running at normal tension on the tape, wire or film, no contact is made by the arms 11 and 12. Release of the tension, as through slowing down of the mechanism as when stopping or starting, will allow the roller 79 to move downward so that blade 12 may engage the contact blade 11, thus closing the circuit between leads 40 and 41. The various amplifiers shown in Figs. 1 and 4 may be used in connection with the reproducing mechanism and contacts shown in Fig. 7. Also, the contact arrangement of Fig. 7 may be replaced with that of Fig. 2 and used with appropriate circuits as, for instance, that of Fig. 3.

Also, the mechanical time delay of Fig. 5 may be used in connection with the mechanism shown in Fig. 7. Fig. 7 shows, therefore, a means whereby the present invention may be applied to systems reproducing film, tape, wire, or similar types of recordings. In all figures, the leads and terminals having corresponding numbers may be connected interchangeably.

While the contacts in Fig. 7 normally close during the squelching operation, it is also possible to use contact arrangements as shown in Fig. 2, which open during the squelching operation, such modification being obvious to anyone skilled in the art, and the general arrangement of Fig. 7 can accordingly be substituted in all of the other systems described.

Fig. 8 shows a further arrangement involving a fly-ball governor, which may be a part of the driving system for any type of recording and may also control the speed. The numbers of the contact blades and connecting leads are the same as in Fig. 2, since for the sake of variety the contacts of Fig. 8 are so arranged as to open when the speed falls below a predetermined value, and changes in the speed of the governor will produce an action similar to that of Fig. 7, and this arrangement is applicable in the reproduction of disc as well as film, tape and wire recording. The contacts are shown in the position which they will maintain while the mechanism is running at normal speed.

In Fig. 8, for the sake of variety, the contact arrangement is one in which the contacts open during the squelching action as in Fig. 2. The contact arrangements of Figs. 1, 2, 5 and 7 may be substituted equally well when used with suitable circuit arrangements as heretofore described in connection with these figures. In Fig. 8, as in Fig. 7 and other figures, choice of the type of contact operation and the associated circuit is obvious to anyone skilled in the art.

In the case of the disc-record phonograph, the squelching action not only prevents the transmission of the signals caused by vibration of the needle or stylus by the moving record, but also any other signals caused by the vibration of the needle or stylus by any other means, as when changing needles, etc. Similarly, in the case of magnetic recordings, the system will prevent the reproduction of noises induced in the magnetic pickup head by vibration or by the presence of any magnetic or metallic objects, as well as by the magnetic record itself. In the case of film recording, any noise caused by vibration or by interruption of the light beam through any other cause, as well as by the film, will also be eliminated. Hence, all normal noises associated with the adjustment of the mechanism while playing the records in the playing position or removing them therefrom, or through normal replacement of elements or picked up from noise sources can be eliminated from the output of the system by means of the squelching action. This squelching action may be dependent upon the position of the pickup or any other part of the mechanism, the relative velocity between the recording and the pickup, or the velocity of any other part of the mechanism. Furthermore, the squelching action and the resumption of transmission may be accomplished gradually thereby eliminating undesirable transient effects on noises as heretofore explained.

In connection with the aforementioned copending applications, which describe systems for controlling the transmission characteristics of a system in accordance with the signal, there is a further advantage in the use of the squelch system, which involves varying a bias on a vacuum tube electrode. If the signal level is relatively high, a certain amount of distortion of the signal may take place during the periods of time when the squelch is becoming effective or ineffective as a result of an unfavorable ratio of signal voltage to bias voltage on the tube at a particular moment or a result of non-linear amplitude response of the vacuum tube. With the noise suppression circuit of the copending applications, providing the connections are so made that the squelch circuit controls the signal applied to the noise suppression circuit, the transmission frequency range of the latter circuit will be greatly reduced during such periods of partial squelch, thus tending to reduce the transmission of harmonics or other spurious components caused by the before-mentioned distortion.

The present invention may be used in connection with any type of system for reproducing recordings of any sort. Many variations and combinations will occur to anyone skilled in the art and are considered as falling within the scope of this invention.

What is claimed is:

1. A system for reproducing a signal from a recording having, in combination, a pick-up unit between which and the recording a predetermined positional relationship may be established in which the pick-up unit may pick up the signal from the recording during relative operation of the pick-up unit and the recording, means for establishing the predetermined positional relationship between the pick-up unit and the recording, means for relatively operating the pick-up unit and the recording at times when the predetermined positional relationship between the pick-up unit and the recording is established to enable the pick-up unit to pick up the signal from the recording, a signal-transmission circuit, means for connecting the pick-up unit to the signal-transmission circuit to render the signal-transmission circuit effective to transmit the picked-up signal in order to reproduce the transmitted picked-up signal, and means for rendering the signal-transmission circuit ineffective to transmit the picked-up signal during the establishment of the predetermined positional relationship by the establishing means and during a predetermined length of time thereafter in order to prevent the transmission and the reproduction of the picked-up signal during the establishment of the predetermined positional relationship by the establishing means and during the said predetermined length of time thereafter.

2. A system for reproducing a signal from a recording having, in combination, a pick-up unit between which and the recording a predetermined positional relationship may be established in which the pick-up unit may pick up the signal from the recording during relative operation of the pick-up unit and the recording, means for relatively operating the pick-up unit and the recording at times when the predetermined positional relationship between the pick-up unit and the recording is established to enable the pick-up unit to pick up the signal from the recording, a signal-transmission circuit, means for connecting the pick-up unit to the signal-transmission circuit to render the signal-transmission circuit effective to transmit the picked-up signal in order to reproduce the transmitted picked-up signal, means for disestablishing the predetermined positional relationship between the pick-up unit and the recording, and means for rendering the signal-transmission circuit ineffective to transmit the picked-up signal during the disestablishment of the predetermined positional relationship by the disestablishing means and during a predetermined length of time thereafter in order to prevent the transmission and the reproduction of the picked-up signal during the disestablishment of the predetermined positional relationship by the disestablishing means and during the said predetermined length of time thereafter.

3. A system for reproducing a signal from a recording having, in combination, a pick-up unit between which and the recording a predetermined velocity relationship may be established in which the pick-up unit may pick up the signal from the recording during relative operation of the pick-up unit and the recording, means for establishing the predetermined velocity relationship between the pick-up unit and the recording, means for relatively operating the pick-up unit and the recording at times when the predetermined velocity relationship between the pick-up unit and the recording is established to enable the pick-up unit to pick up the signal from the recording, a signal-transmission circuit, means connecting the pick-up unit to the signal-transmission circuit to render the signal-transmission circuit effective to transmit the picked-up signal in order to reproduce the transmitted picked-up signal, and means for rendering the signal-transmission circuit ineffective to transmit the picked-up signal during the establishment of the predetermined velocity relationship by the establishing means and during the said predetermined length of time thereafter.

4. A system for reproducing a signal from a recording having, in combination, a pick-up unit between which and the recording a predetermined velocity relationship may be established in which the pick-up unit may pick up the signal from the recording during relative operation of the pick-up unit and the recording, means for relatively operating the pick-up unit and the recording at times when the predetermined velocity relationship between the pick-up unit and the recording is established to enable the pick-up unit to pick up the signal from the recording, a signal-transmission circuit, means for connecting the pick-up unit to the signal-transmission circuit to render the signal-transmission circuit effective to transmit the picked-up signal in order to reproduce the transmitted picked-up signal, means for disestablishing the predetermined velocity relationship between the pick-up unit and the recording, and means for rendering the signal-transmission circuit ineffective to transmit the picked-up signal during the disestablishment of the predetermined velocity relationship by the disestablishing means and during a predetermined length of time thereafter in order to present the transmission and the reproduction of the picked-up signal during the disestablishment of the predetermined velocity relationship by the disestablishing means and during the said predetermined length of time thereafter.

5. A system for reproducing a signal from a recording having, in combination, a pick-up unit between which and the recording a predetermined positional relationship may be established in which the pick-up unit may pick up the signal from the recording during relative operation of the pick-up unit and the recording, means for relatively operating the pick-up unit and the recording at times when the predetermined positional relationship between the pick-up unit and the recording is established to enable the pick-up unit to pick up the signal from the recording, a signal-transmission circuit, means for connecting the pick-up unit to the signal-transmission circuit to render the signal-transmission circuit effective to transmit the picked-up signal in order to reproduce the transmitted picked up signal, and means for rendering the signal-transmission circuit ineffective to transmit the picked-up signal during the establishment or the disestablishment of the predetermined positional relationship and during a predetermined length of time thereafter in order to prevent the transmission of the reproduction of the picked-up signal during the establishment or the disestablishment of the predetermined positional relationship by the disestablishing means and during the said predetermined length of time thereafter.

6. A system for reproducing a signal from a recording having, in combination, a pick-up unit between which and the recording a predetermined positional relationship and a predetermined velocity relationship may be established in which the pickup unit may pick up the signal from the recording during relative operation of the pick-up unit and the recording, means for establishing the predetermined positional relationship between the pick-up unit and the recording, means for establishing the predetermined velocity relationship between the pickup unit and the recording, means for relatively operating the pick-up unit and the recording at times when the predetermined positional relationship and the predetermined velocity relationship between the pick-up unit and the recording is established to enable the pick-up unit to pick up the signal from the recording, a signal-transmission circuit, means for connecting the pick-up unit to the signal-transmission circuit to render the signal-transmission circuit effective to transmit the picked up signal in order to reproduce the transmitted picked-up signal, means for disestablishing the predetermined positional relationship between the pick-up unit and the recording, means for disestablishing the predetermined velocity relationship between the pick-up unit and the recording, means for rendering the signal-transmission circuit ineffective to transmit the picked-up signal during the establishment of the predetermined positional relationship by the positional-relationship-establishing means or during the establishment of the predetermined velocity relationship by the velocity-relationship-establishing means and during a predetermined length of time thereafter in order to prevent the transmission and the reproduction of the picked-up signal during the establishment of the predetermined positional relationship by the positional-relationship-establishing means or the transmission and the reproduction of the picked-up signal during the establishment of the predetermined velocity relationship by the velocity-relationship-establishing means, respectively, and during the said predetermined length of time thereafter, and means for rendering the signal-transmission circuit ineffective to transmit the pick-up signal during the disestablishment of the predetermined positional relationship by the positional-relationship-disestablishing means or during the disestablishment of the predetermined velocity relationship by the velocity-relationship disestablishing means and during a second predetermined length of time thereafter in order to prevent the transmission and reproduction of the picked-up signal during the disestablishment of the predetermined positional relationship by the positional-relationship-disestablishing means or the transmission and the reproduction of the picked-up signal during the disestablishment of the predetermined velocity relationship by the velocity-relationship-disestablishing means, respectively, and during the second predetermined length of time thereafter.

7. A system for reproducing a signal from a recording having, in combination, a pick-up unit between which and the recording a predetermined relationship may be established in which the pick-up unit may pick up the signal from the recording during relative operation of the pick-up unit and the recording, means for establishing the predetermined relationship between the pick-up unit and the recording, means for relatively operating the pick-up unit and the recording at times when the predetermined relationship between the pick-up unit and the recording is established to enable the pick-up unit to pick up the signal from the recording, a signal-transmission circuit, means connecting the pick-up unit to the signal-transmission circuit to render the signal-transmission circuit effective to transmit the picked-up signal in order to reproduce the transmitted picked-up signal, means for rendering the signal-transmission circuit ineffective to transmit the picked-up signal during the establishment of the predetermined relationship by the establishing means in order to prevent the transmission and the reproduction of the picked-up signal during the establishment of the predetermined relationship by the establishing means, and means for rendering the signal transmission effective gradually during the establishment of the predetermined relationship.

8. A system for reproducing a signal from a recording having, in combination, a pick-up unit between which and the recording a predetermined relationship may be established in which the pick-up unit may pick up the signal from the recording during relative operation of the pick-up unit and the recording, means for relatively operating the pick-up unit and the recording at times when the predetermined relationship between the pick-up unit and the recording is established to enable the pick-up unit to pick up the signal from the recording, a signal-transmission circuit, means connecting the pick-up unit to the signal-transmission circuit to render the signal-transmission circuit effective to transmit the picked-up signal in order to reproduce the transmitted picked-up signal, means for disestablishing the predetermined relationship between the pick-up unit and the recording, means for rendering the signal-transmission circuit ineffective to transmit the picked-up signal during the disestablishment of the predetermined relationship by the disestablishing means in order to prevent the transmission and the reproduction of the picked-up signal during the disestablishment of the predetermined relationship by the disestablishing means, and means for reducing the signal transmission gradually during the disestablishment of the predetermined relationship.

9. A system for reproducing a signal from a recording having, in combination, a pick-up unit between which and the recording a predetermined relationship may be established in which the pick-up unit may pick up the signal from the recording during relative operation of the pick-up unit and the recording, means for establishing the predetermined relationship between the pick-up unit and the recording, means for relatively operating the pick-up unit and the recording at times when the predetermined relationship between the pick-up unit and the recording is established to enable the pick-up unit to pick up the signal from the recording, a signal-transmission circuit, means connecting the pick-up unit to the signal-transmission circuit to render the signal-transmission circuit effective to transmit the picked-up signal in order to reproduce the transmitted picked-up signal, means for disestablishing the predetermined relationship between the pick-up unit and the recording, means for rendering the signal-transmission circuit ineffective to transmit the picked-up signal during the establishment and the disestablishment of the predetermined relationship by the establishing means and the disestablishing means, respectively, in order to prevent the transmission and the reproduction of the picked-up signal during the establishment and the disestablishment of the predetermined relationship by the establishing and the disestablishing means, respectively, and means for rendering the signal transmission effective gradually during the establishment of the predetermined relationship and for reducing the signal transmission gradually during the disestablishment of the predetermined relationship.

10. A system for reproducing a signal from a recording having, in combination, a pick-up unit for picking up the signal from the recording, positioning means for establishing a predetermined series of positional arrangements between said pickup and said recording, a signal-transmission circuit comprising a vacuum tube having a plurality of electrodes and means for applying voltages between the electrodes, means connecting the pick-up unit between the electrodes to render the signal-transmission circuit effective to transmit the picked-up signal in order to reproduce the transmitted picked-up signal, and means controlled by said positioning means for varying one of the applied voltages under predetermined conditions to render the signal-transmission circuit ineffective to transmit the picked-up signal in order to prevent the transmission and the reproduction of the picked-up signal under the predetermined conditions.

11. A system for reproducing a signal from a recording having, in combination, a pick-up unit adapted to occupy predetermined positions relative to the recording in which the pick-up unit may pick up the signal from the recording during relative operation of the pick-up unit and the recording, positioning means for establishing a predetermined series of positional arrangements between said pickup and said recording, means for relatively operating the pick-up unit and the recording at times when the pick-up unit occupies the predetermined positions to enable the pick-up unit to pick up the signal from the recording, a signal-transmission circuit comprising a vacuum tube having a plurality of electrodes and means for applying voltages between the electrodes, means connecting the pick-up unit between the electrodes to render the signal-transmission circuit effective to transmit the picked-up signal in order to reproduce the transmitted picked-up signal, and means controlled by said positioning means for varying one of the applied voltages when the pick-up unit occupies a predetermined position or a series of predetermined positions relative to the recording to render the signal-transmission circuit ineffective to transmit the picked-up signal in order to prevent the transmission and the reproduction of the picked-up signal when the pick-up unit occupies the said predetermined position or series of predetermined positions.

12. A system for reproducing a signal from a recording having, in combination, a pick-up unit for picking up the signal from the recording, a signal transmission circuit comprising vacuum-tube apparatus provided with a bias, means connecting the pick-up unit to the signal-transmission circuit to render the signal-transmission circuit effective to transmit the picked-up signal in order to reproduce the transmitted picked-up signal, and means for establishing a predetermined positional relationship between said pickup and said recording, said means comprising means for controlling the bias under predetermined conditions to render the signal-transmission circuit ineffective to transmit the picked-up signal in order to prevent the transmission and the reproduction of the picked-up signal under the predetermined conditions.

13. A system for reproducing a signal from a recording having, in combination, a pick-up unit, means for relatively operating the pick-up unit and the recording to enable the pick-up unit to pick up the signal from the recording, a signal-transmission circuit comprising vacuum-tube apparatus provided with a bias, means connecting the pick-up unit to the signal-transmission circuit to render the signal-transmission circuit effective to transmit the picked-up signal in order to reproduce the transmitted picked-up signal, and means for controlling the bias in accordance with the relative velocity between the pick-up unit and the recording to render the signal-transmission circuit ineffective to transmit the picked-up signal in order to prevent the transmission and the reproduction of the picked-up signal at a predetermined relative velocity between the pick-up unit and the recording.

14. A system for reproducing a signal from a recording that may be subjected to tension during the operation of the recording having, in combination, a pick-up unit for picking up the signal from the recording during the operation of the recording, means for operating the recording and thereby subjecting the recording to tension, a signal-transmission circuit, means connecting the pick-up unit to the signal-transmission circuit to render the signal-transmission circuit effective to transmit the picked-up signal in order to reproduce the transmitted picked-up signal, and means controlled in accordance with the tension to which the recording is subjected to render the signal-transmission circuit ineffective to transmit the picked-up signal in order to prevent the transmission and the reproduction of the picked-up signal under predetermined conditions of tension of the recording.

15. A system for reproducing a signal from a recording that may be subjected to tension during the operation of the recording having, in combination, a pick-up unit for picking up the signal from the recording during the operation of the recording, means for operating the recording and thereby subjecting the recording to tension, a signal-transmission circuit comprising vacuum-tube apparatus provided with a bias, means connecting the pick-up unit to the signal-transmission circuit to render the signal-transmission circuit effective to transmit the picked-up signal in order to reproduce the transmitted picked-up signal, and means for controlling the bias in accordance with the tension to which the recording is subjected to render the signal-transmission circuit ineffective to transmit the picked-up signal in order to prevent the transmission and the reproduction of the picked-up signal under predetermined conditions of tension of the recording.

16. A reproducing system having, in combination, a pick-up unit, means for relatively operating the pick-up unit and each of a plurality of recordings from which the pick-up unit may pick up a signal during such relative operation, a recording changer for stopping one recording, changing to another recording, and starting the said other recording, a signal-transmission circuit, means connecting the pick-up unit to the signal-transmission circuit to render the signal-transmission circuit effective to transmit the picked-up signal in order to reproduce the transmitted picked-up signal, and means controlled by the recording changer for rendering the signal-transmission circuit ineffective to transmit the picked-up signal during a predetermined length of time from prior to the stopping of the said one recording, including the changing of the said other recording, and until after the starting of the said other recording in order to prevent the transmission and the reproduction of the picked-up signal during the said predetermined length of time.

17. A reproducing system having, in combination, a pick-up unit, means for relatively operating the pick-up unit and each of a plurality of recordings from which the pick-up unit may pick up a signal during such relative operation, a recording changer for stopping one recording, changing to another recording, and starting the said other recording, a signal-transmission circuit comprising a vacuum tube having a plurality of electrodes and means for applying voltages between the electrodes, means connecting the pick-up unit between the electrodes, means connecting the pick-up to render the signal-transmission circuit effective to transmit the picked-up signal in order to reproduce the transmitted picked-up signal, and means controlled by the recording changer for varying one of the applied voltages to render the signal-transmission circuit ineffective to transmit the picked-up signal during a predetermined length of time from prior to the stopping of said one recording, including the changing of the said other recording, and until after the starting of the said other recording in order to prevent the transmission and the reproduction of the picked-up signal during the said predetermined length of time.

18. A reproducing system having in combination a pickup element for picking up a signal from a recording, an electric circuit connected with the pickup element for transmitting the picked-up signal having vacuum-tube apparatus provided with a control grid and means for biasing the control grid and means controlled by the pickup element for gradually controlling the bias to disconnect the electric circuit gradually from the pickup element before the introduction of spurious signals and gradually reconnecting the electric circuit to the pickup element after the occurrence of the spurious signals.

19. In a system for reproducing signals from recordings, means for picking up the signal from the recording, means for transmitting said signal, means controlled by said pickup means for disabling said transmitting means while said signal is being picked up from predetermined portions of the recording, and means for resuming the transmission of said signal at a gradual predetermined rate.

20. A system for reproducing signals from a plurality of recordings having in combination a pickup unit, means for establishing a predetermined positional relationship between said pickup unit and one of said recordings so that the pickup unit may pick up said signals from said recording, means for disestablishing said positional relationship and for establishing a similar positional relationship between said pickup and another of said recordings, means for transmitting the signals picked up by said pickup from said recordings and means controlled by said positioning means and substantially extinguishing said transmission during the disestablishment of said positional relationship between said pickup and the first-named recording and the establishment of said positional relationship between said pickup and the second-named recording and for a predetermined length of time thereafter.

21. A system for reproducing signals from a plurality of recordings having in combination a pickup unit, means for establishing a predetermined positional relationship between said pickup unit and one of said recordings so that the pickup unit may pick up said signal from the recording, means for disestablishing said positional relationship and for establishing a similar positional relationship between said pickup and another of said recordings, means for transmitting the signals picked up by said pickup from said recordings and means controlled by said positioning means and substantially extinguishing said transmission during the disestablishment of said positional relationship between said pickup and the first-named recording and the establishment of said positional relationship between said pickup and said second recording and restoring said transmission gradually a predetermined length of time thereafter.

HERMON HOSMER SCOTT.

REFERENCES CITED

The following references are of record in the file of this patent:

UNITED STATES PATENTS

| Number | Name | Date |
|---|---|---|
| 1,625,918 | Thomas | Apr. 26, 1927 |
| 1,840,660 | Erbe | Jan. 12, 1932 |
| 1,864,890 | Cloud | June 28, 1932 |
| 1,928,410 | Cook | Sept. 26, 1933 |
| 2,012,326 | Thompsett | Aug. 27, 1935 |
| 2,112,699 | Kleber | Mar. 29, 1938 |
| 2,214,482 | Schmidt | Sept. 10, 1940 |

FOREIGN PATENTS

| Number | Country | Date |
|---|---|---|
| 298,276 | Great Britain | Oct. 8, 1928 |
| 298,277 | Great Britain | Oct. 8, 1928 |